United States Patent
Wang et al.

(10) Patent No.: US 9,654,931 B2
(45) Date of Patent: May 16, 2017

(54) MOBILE DEVICE NETWORK CONFIGURATION VIA SPEED DETERMINATION

(75) Inventors: Feng Wang, Austin, TX (US); Mostafa Tofighbakhsh, Cupertino, CA (US); David Wolter, Austin, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 352 days.

(21) Appl. No.: 13/215,280

(22) Filed: Aug. 23, 2011

(65) Prior Publication Data

US 2013/0051251 A1  Feb. 28, 2013

(51) Int. Cl.
| | | |
|---|---|---|
| H04W 4/02 | (2009.01) | |
| H04W 36/32 | (2009.01) | |
| H04W 48/18 | (2009.01) | |
| H04W 64/00 | (2009.01) | |
| H04W 88/06 | (2009.01) | |

(52) U.S. Cl.
CPC ............ *H04W 4/027* (2013.01); *H04W 36/32* (2013.01); *H04W 48/18* (2013.01); *H04W 64/006* (2013.01); *H04W 88/06* (2013.01)

(58) Field of Classification Search
CPC ... H04W 36/00–36/385; H04W 48/04; H04W 4/027; H04W 48/18; H04W 64/006; H04W 88/06
USPC ........ 370/216–230, 241, 252, 310, 328–332, 370/334; 455/436–444
See application file for complete search history.

(56) References Cited

U.S. PATENT DOCUMENTS

| | | |
|---|---|---|
| 5,506,584 A | 4/1996 | Boles |
| 7,970,540 B2 | 6/2011 | Laberteaux |
| 2005/0095989 A1 | 5/2005 | Brouwer |
| 2006/0160540 A1* | 7/2006 | Strutt et al. ................... 455/440 |
| 2006/0268756 A1* | 11/2006 | Wang et al. ................... 370/310 |
| 2007/0004394 A1* | 1/2007 | Chu et al. ................... 455/422.1 |
| 2007/0218906 A1* | 9/2007 | Melia et al. ................... 455/436 |
| 2007/0259690 A1* | 11/2007 | Julian et al. ................... 455/557 |
| 2008/0248741 A1 | 10/2008 | Alizadeh-Shabdiz |
| 2008/0248808 A1 | 10/2008 | Alizadeh-Shabdiz |

(Continued)

FOREIGN PATENT DOCUMENTS

CN WO 2010/133040    * 11/2010

OTHER PUBLICATIONS

WO 2010/133040 Machine Translation.*

*Primary Examiner* — Eric Myers
(74) *Attorney, Agent, or Firm* — Toler Law Group, PC

(57) ABSTRACT

In one or more embodiments, a mobile device can determine its speed and can utilize a wireless network based on its determined speed. In one example, the mobile device can be within a communications range of a wireless access point that implements a wireless local area network and can utilize a mobile telephone network for data communications rather than the wireless local area network when the mobile device is traveling at or above a certain speed. In another example, the mobile device can receive a signal from the wireless access point and, based on the signal and the speed of the mobile device, the mobile device can utilize the wireless access point at or above the certain speed. For instance, the signal can include a beacon indicating that the wireless access point can be utilized for data communications when the mobile device is traveling at or above a certain speed.

20 Claims, 14 Drawing Sheets

(56) References Cited

U.S. PATENT DOCUMENTS

| | | |
|---|---|---|
| 2009/0239549 A1 | 9/2009 | Grigsby et al. |
| 2010/0074221 A1* | 3/2010 | Hong et al. ................... 370/331 |
| 2010/0085947 A1 | 4/2010 | Ringland et al. |
| 2010/0296415 A1* | 11/2010 | Sachs et al. ................. 370/254 |
| 2011/0182273 A1* | 7/2011 | George et al. ................ 370/338 |
| 2011/0191465 A1 | 8/2011 | Hofstaedter et al. |
| 2011/0241827 A1* | 10/2011 | Varoglu ....................... 340/5.52 |
| 2012/0058763 A1* | 3/2012 | Zhao ............................ 455/434 |
| 2012/0108252 A1* | 5/2012 | Dimou et al. ................ 455/450 |
| 2012/0122515 A1* | 5/2012 | Han et al. .................... 455/525 |
| 2013/0294314 A1* | 11/2013 | Lee et al. ..................... 370/311 |

\* cited by examiner

MOBILE DEVICE NETWORK CONFIGURATION VIA SPEED DETERMINATION

BACKGROUND

1. Technical Field

This disclosure relates generally to the field of wireless mobile devices that can utilize two or more networks, and, more specifically, this disclosure pertains to the field of determining a network to utilized based on one or more speed determinations.

2. Description of the Related Art

In the past, a mobile device (e.g., a smart-phone, a tablet computing device, etc.) could utilize either a mobile telephone network or a wireless network provided via one or more Wi-Fi access points. Mobile telephone network operators have tried to offload data traffic (e.g., non-voice data) to Wi-Fi network implemented via Wi-Fi access points. However, when the mobile device is traveling at or above a certain speed, offloading data traffic (e.g., non-voice data) to a stationary Wi-Fi access point can be ineffectual or unproductive, since a coverage area of the stationary Wi-Fi access point is usually too small to be used for a effective period of time while the mobile device is traveling at or above the certain speed.

BRIEF DESCRIPTION OF THE DRAWINGS

The preferred embodiment(s) will become apparent upon reading the following detailed description and upon reference to the accompanying drawings in which.

Figure 1:
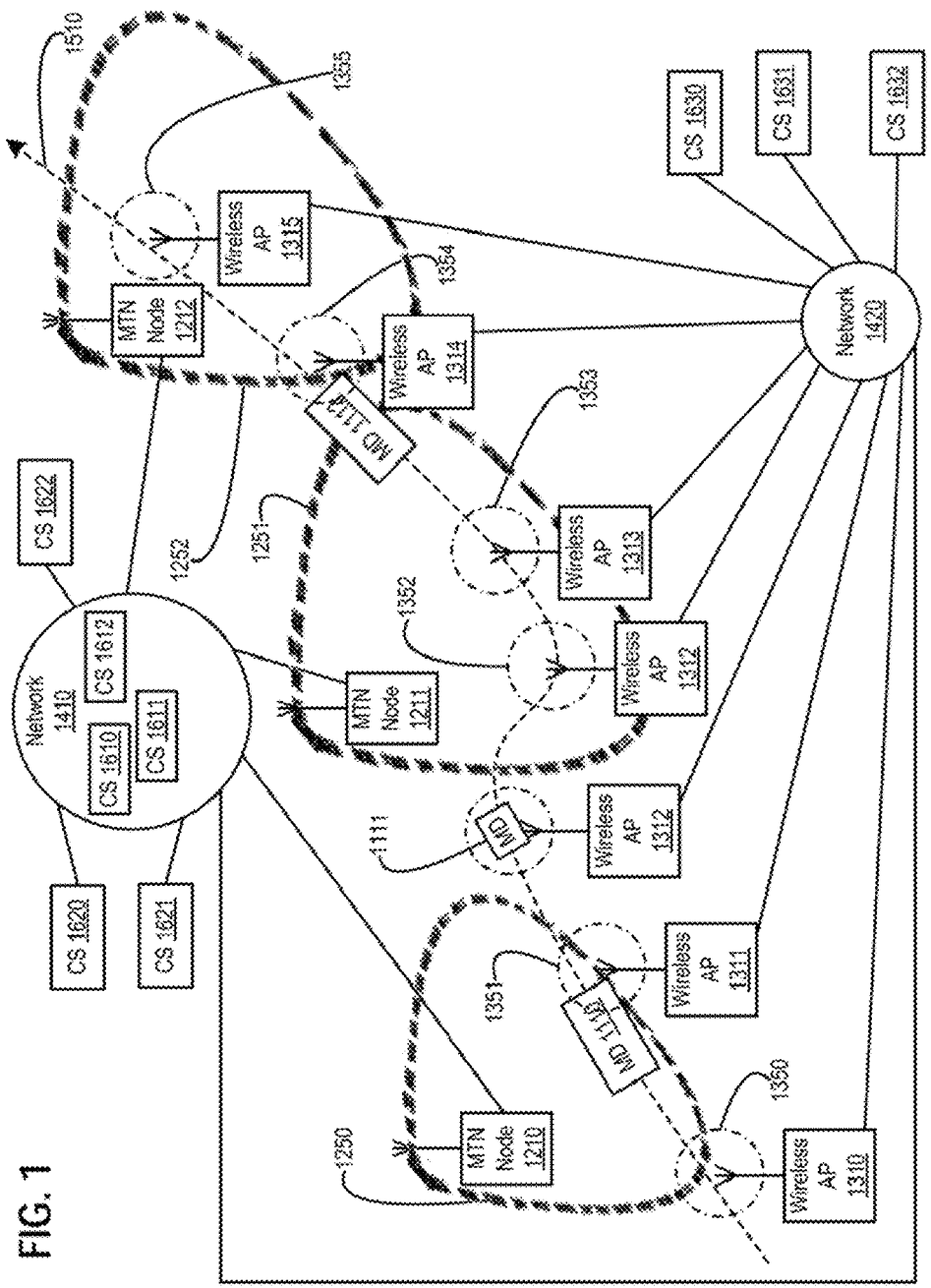
FIG. 1 provides a block diagram of one or more network communications systems and mobile devices traversing a path or route, according to one or more embodiments.

While the described embodiments may be susceptible to various modifications and alternative forms, specific embodiments thereof are shown by way of example in the drawings and will herein be described in detail. It should be understood, however, that the drawings and detailed description thereto are not intended to limit the disclosure to the particular form disclosed, but on the contrary, the disclosure is to cover all modifications, equivalents and alternatives falling within the spirit and scope of an invention as defined by appended claims.

DETAILED DESCRIPTION

In one or more embodiments, a mobile device, operated by a user, can determine one or more parameters and can utilize a wireless network based on the one or more determined parameters. For example, the mobile device can determine its speed and can utilize a wireless network based on its determined speed. For instance, the mobile device can determine a speed above a threshold speed and utilize a mobile telephone network for data communications (e.g., packet data communications such as Internet protocol communications, etc.) rather than a wireless local area network. For example, the mobile device can be within a communications range of a wireless access point that implements a wireless local area network and can utilize a mobile telephone network for data communications rather than a wireless local area network when the mobile device is traveling at or above a certain speed. In one instance, when the mobile device is traveling at or above a certain speed, utilization of a wireless local area network may not be possible or may be possible for a period of time transpiring that may not be considered useful by the user of the mobile device. In another instance, when the mobile device is traveling at or above a certain speed, utilization of a wireless local area network may not be optimum for communications for a period of time transpiring that may not be considered useful by the user of the mobile device.

In one or more embodiments, a mobile device operated by a user can determine its speed and can utilize a wireless network based on its determined speed and based on a signal received from a wireless local area network. In one example, the mobile device can receive a signal from a wireless access point that implements a wireless local area network, and based on the signal and the determined speed of the mobile device, the mobile device can utilize the wireless access point at or above a certain speed determined for the mobile device. For instance, the wireless access point can transmit a beacon that can indicate that the wireless access point can be utilized for data communications (e.g., packet data communications such as Internet protocol communications, etc.) when the mobile device is traveling at or above a certain speed. In another example, the mobile device can receive a signal from a wireless access point that implements a wireless local area network, and based on the signal and the determined speed of the mobile device, the mobile device can utilize the wireless access point at or below a certain speed determined for the mobile device. For instance, the wireless access point can transmit a beacon that can indicate that the wireless access point can be utilized for data communications (e.g., packet data communications such as Internet protocol communications, etc.) when the mobile device is traveling at or below a certain speed.

In one or more embodiments, a mobile device operated by a user can determine its speed and can utilize a wireless network based on its determined speed and based on multiple signals received from a wireless local area network over a period of time transpiring. For example, the mobile device can determine its speed to be at or above a threshold speed and can determine that multiple signals have been received from a wireless access point over a period of time transpiring. For instance, the mobile device can determine that multiple signals, that include a same media access control address, have been received from a wireless access point over a period of time transpiring. In one or more embodiments, the mobile device can utilize the wireless access point for data communications (e.g., packet data communications such as Internet protocol communications, etc.) when a determined speed of the mobile device is at or above a threshold speed and after multiple signals that include a same media access control address have been received, from the wireless access point, over a period of time transpiring.

Turning now to FIG. 1, a block diagram of one or more network communications systems and mobile devices traversing a path or route is illustrated, according to one or more embodiments. As shown, one or more mobile devices (MDs) 1110-1112 can traverse a path and/or route 1510. In one or more embodiments, a mobile device (MD) can traverse path and/or route 1510 via a vehicle (e.g., a boat, a motorcycle, a bus, a train, a plane, an automobile, etc.). As illustrated, MD 1110 can access a coverage 1250 of a mobile telephone network (MTN) node 1210, and MD 1112 can access a coverage 1251 of a MTN node 1211.

As shown, MTN nodes 1210-1212 can be coupled to a network 1410. In one or more embodiments, network 1410 can implement and/or provide access and/or services of one or more other networks. In one example, network 1410 can provide access to and/or services of a public network (e.g., an Internet) to one or more of MDs 1110-1112. In another example, network 1410 can provide access to and/or services of a network 1420 and/or a network coupled to network 1420. In one or more embodiments, network 1410 can be and/or implement a telecommunications network (e.g., a mobile telecommunications network).

For instance, network 1410 can be and/or implement a wireless telecommunications network that can support one or more wireless telecommunications network protocols such as one or more of General Packet Radio Service (GPRS), enhanced data rates for GSM (global system for mobile communications) evolution (EDGE), long term evolution, (LTE), CDMA (code division multiple access), TDMA (time division multiple access), and FDMA (frequency division multiple access), among others. In one or more embodiments, network 1410 can be coupled to and/or include a telephony network that can include a wireless cellular telecommunications network and/or a wireless satellite telecommunications network. In one or more embodiments, the telephony network can communicate information such as voice and/or data. In one or more embodiments, one or more of MDs 1110-1112 can communicate with network 1410 in a wireless fashion. In one or more embodiments, network 1410 provides access and/or services of one or more other networks at a lower data rate than a network 1420 can provide to one or more of MDs 1110-1112. For example, network 1410 can include less bandwidth than network 1420.

As shown, one or more wireless access points (APs) 1310-1315 can be coupled to network 1420 and can respectively provide communications access of network 1420 to one or more devices coupled to the respective wireless AP. In one or more embodiments, a wireless access point (e.g., a wireless access point of wireless APs 1310-1315) can communicate with one or more devices (e.g., one or more of MDs 1110-1112) using one or more of Institute of Electrical and Electronics Engineers (IEEE) 802.16, IEEE 802.11, IEEE 802.15, IEEE 802.15.4, Z-Wave, ZigBee, wireless Ethernet, ultra wide band, wireless universal serial bus (USB) and infrared communication technologies, among others. In one or more embodiments, a wireless access point (AP) can include a transceiver to communicate with one or more devices using one or more wireless methods, processes, protocols, systems, and/or wireless spectrums (e.g., frequency ranges). In one example, a wireless AP can communicate with one or more devices using one or more ISM (industrial, scientific and medical) bands. For instance, an ISM band can include a frequency range of 6.765-6.795 Mhz, 433.05-434.79 Mhz, 902-928 Mhz, 2.4-2.5 Ghz, 5.725-5.875 Ghz, or 24.0-24.25 Ghz, among others.

In one or more embodiments, network 1420 can provide access and/or services of one or more other networks to MDs 1110-1112 via one or more wireless APs. In one or more embodiments, access to these networks can include one or more "services" these networks may provide. For example, these one or more services can include one or more of: email, world wide web, file transfer, printing, file sharing, file system sharing, remote file system, network file system (NFS), news, multicast, netbios, encryption, domain name service (DNS), routing, tunneling, chat such as Internet Remote Chat and/or AOL Instant Messenger, gaming, licensing, license management, digital rights management, network time, remote desktop, remote windowing, audio, database (e.g., Oracle, Microsoft SQL Server, PostgreSQL, etc.), authentication, accounting, authorization, virtual local area network (VLAN) (e.g., IEEE 802.1q), virtual private network or VPN, audio, phone, Voice Over Internet Protocol (VoIP), paging, and video, among others. In one or more embodiments, the one or more service can be associated with and/or correspond to one or more protocols of one or more computer and/or software applications.

In one or more embodiments, network 1410 and/or network 1420 can include a wired network, a wireless network or a combination of wired and wireless networks. Network 1410 and/or network 1420 can include and/or be coupled to various types of communications networks, such as a public switched telephone network (PSTN), an Internet, a wide area network (WAN) (e.g., a private WAN, a corporate WAN, a public WAN, etc.), a local area network (LAN). In one or more embodiments, a wireless AP can be coupled to a PSTN, e.g., via: Ethernet cable and DSL; a cable (television) based network; a satellite-based system; and/or a fiber based network; among others. In one or more embodiments, network 1410 and/or network 1420 can include one or more wireless networks, e.g., based on IEEE 802.11 and/or IEEE 802.16. For instance, one or more of wireless APs 1310-1315 can be coupled to network 1420 in a wireless fashion. Network 1410 and/or network 1420 can include one or more DSL (digital subscriber line) and/or cable (e.g., cable television) networks and/or infrastructures.

For example, network 1410 and/or network 1420 can include one or more of: cable modems, cable modem termination systems (CMTSs), satellite modems, DSL modems, digital subscriber line access multiplexers (DSLAMs), broadband remote access servers (BRASs), telecommunications circuits, and/or metropolitan area networks (MANs), among others. In one or more embodiments, network 1420 may form part of the Internet, or may couple to other networks, e.g., other local or wide area networks such as the Internet. In one or more embodiments, a wireless AP can be a system operable to be coupled to and/or include networking equipment usable to couple the wireless AP to network 1420. In one example, wireless AP 1311 can include a wired Ethernet interface that can be coupled to a cable modem or a DSL modem that can be coupled to network 1420. In another example, wireless AP 1314 can include a FDDI (fiber distributed data interface) that can be coupled to a router and/or gateway device that can be coupled to network 1420.

In one or more embodiments, each MD of MDs 1110-1112 can include and/or can be coupled to one or more transceivers that allow the MD to communicate with network 1410 and/or a wireless AP of wireless APs 1310-1315. For example, MD 1110 can include or be coupled to a first transceiver that can communicate with MTN node 1210 and/or include or be coupled to a second transceiver to communicate with wireless AP 1311. For instance, MD 1110 can include or be coupled to a first transceiver that can communicate with a cellular telephone system of or coupled to network 1410 and/or include or be coupled to a second transceiver, such as a wireless Ethernet transceiver, to communicate with wireless AP 1311.

As shown, network 1410 can include computer systems 1610-1612, and computer systems 1620-1622 can be coupled to network 1410. In one or more embodiments, one or more of computer systems 1610-1612 and 1620-1622 can implement and/or perform one or more operations of network 1410 and/or a mobile telephone network. As illustrated, computer systems 1630-1632 can be coupled to network 1420. In one or more embodiments, each MD of MDs 1110-1112 can communicate with one or more of computer systems 1630-1632 via network 1420.

In one example, each MD of MDs 1110-1112 can communicate with one or more of computer systems 1630-1632 via network 1420 and a wireless AP (e.g., a wireless AP of wireless APs 1310-1315) coupled to network 1420. In a second example, each MD of MDs 1110-1112 can communicate with one or more of computer systems 1630-1632 via network 1420, network 1410, and a MTN node (e.g., a MTN node of MTN nodes 1210-1212) coupled to network 1410 which is coupled to network 1420. In one or more embodiments, one or more of MDs 1110-1112 can communicate with one or more of computer systems 1630-1632 via one or more of an Internet protocol (IP), a transmission control protocol (TCP), a user datagram protocol (UDP), an Internet control message protocol (ICMP), a simple network management protocol (SNMP), and a hypertext transfer protocol (HTTP), among others.

In one or more embodiments, a MD can determine that communications with a wireless AP are possible; however, a speed of the MD can cause a use of the wireless AP to be too brief for a significant utilization of network access or to be not possible. For instance, MD 1110 can travel at a speed and intersect a coverage 1351 of wireless AP 1311. MD 1110 can determine that communications with wireless AP 1311 are possible; however, the speed of MD 1110 can cause a use of wireless AP 1311 to be too brief for a significant utilization of network 1420 or to be not possible.

In one or more embodiments, a coverage of a wireless AP or a MTN node can include an area or a volume. For example, coverage 1351 can include an area with a radius of one hundred and thirty-two (132) feet from an antenna of wireless AP 1311, and the speed of MD 1110 can be sixty (60) miles per hour (MPH). For instance, AP 1311 can be at a fixed location or can have a zero (0) speed. Accordingly, sixty (60) MPH yields eighty-eight (88) feet per second (FPS). In this example, a utilization of wireless AP 1311 to access network 1420 can be possible for three (3) seconds. This amount of time can be too brief for a significant utilization of network 1420 or utilization of network 1420 may not be possible within this amount of time. Furthermore, this amount of time can reduce a quality of service if MD 1110 communicates with wireless AP 1311. In one or more embodiments, a speed of a MD can be determined, and the MD may not communicate with a wireless AP (e.g., a wireless AP of wireless APs 1310-1315) when the determined speed of the MD is at or above a specific speed.

For example, the specific speed for MD 1110 can be eighteen (18) MPH, and MD 1110 may not communicate with wireless AP 1310 when the speed of MD 1110 is determined to be at or above eighteen (18) MPH. When MD 1110 is traveling below eighteen (18) MPH, MD 1110 can utilize wireless AP 1311 for a period of time up to ten (10) seconds, in this example. When MD 1110 is traveling at or above eighteen (18) MPH, MD 1110 can utilize MTN node 1210 to communicate with network 1420, in this example. For instance, MD 1110 can utilize MTN nodes 1210-1212 when intersecting respective coverages 1250-1252 and at a speed of or above eighteen (18) MPH to communicate with network 1420, and MD 1110 can utilize wireless APs 1310-1315 when intersecting respective coverages 1350-1355 and below a speed of eighteen (18) MPH to communicate with network 1420.

In one or more embodiments, a speed of a MD can be determined and a size of a buffer, that can be transmitted, can be determined, and the MD can communicate with a wireless AP (e.g., a wireless AP of wireless APs 1310-1315) when the determined speed of the MD is at or below a specific speed and when the determined size of the buffer is at or below a specific size. For example, transmitting the buffer to a wireless AP can utilize an amount of time up to ten (10) seconds, based on the determined size of the buffer and based on a communication speed with the wireless AP. For instance, if the MD can communicate with the wireless AP for at least ten (10) seconds, based on the determined speed of the MD, then the MD can transmit contents of the buffer to the wireless AP.

Figure 2:
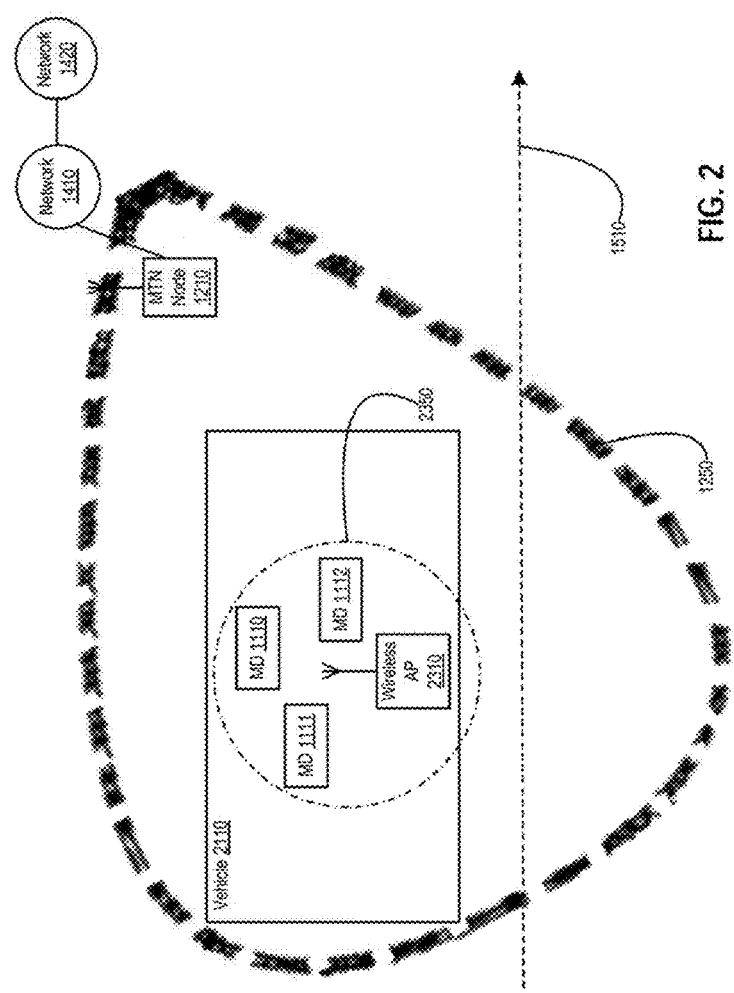
FIG. 2 provides a block diagram of one or more network communications systems and at least one mobile device and a wireless access point traversing a path or route, according to one or more embodiments.

Turning now to FIG. 2, a block diagram of one or more network communications systems and at least one mobile device and a wireless access point traversing a path or route is illustrated, according to one or more embodiments. As shown, a vehicle 2110 can be traversing path or route 1510. In one or more embodiments, a vehicle (e.g., a boat, a motorcycle, a bus, a train, a plane, an automobile, etc.) can include a wireless AP that can be utilized by one or more MDs to communicate with a network. As illustrated, vehicle 2110 can include a wireless AP 2310, and one or more of MDs 1110-1112 can wirelessly communicate with wireless AP 2310 when intersecting a coverage 2350 of wireless AP 2310. For example, one or more of MDs 1110-1112 can be traveling at relatively the same speed as AP 2310 and can utilize one or more variations of one or more signals from AP 2310 in determining that AP 2310 can be utilized for communications with one or more of computer systems 1630-1633.

In one or more embodiments, wireless AP 2310 can include a first wireless network interface that can communicate with one or more MDs (e.g., one or more of MDs 1110-1112), and wireless AP 2310 can include a second wireless network interface that can communicate with one or more MTN nodes (e.g., one or more of MTN nodes 1210-1212). As illustrated, wireless AP 2310 can intersect coverage 1250 of MTN node 1210. When wireless AP 2310 intersects a coverage of a MTN node, wireless AP 2310 can utilize its second wireless network interface to communicate with the MTN node. In one or more embodiments, wireless AP 2310 can include one or more structures and/or perform one or more functions of a router that can allow one or more MDs to communicate with a MTN node via the first and second wireless network interfaces of wireless AP 2310. For example, one or more of MDs 1110-1112 can utilize wireless AP 2310 to communicate with one or more computer systems coupled to network 1420.

In one or more embodiments, wireless AP 2310 can transmit a signal, via the first wireless network interface, indicating that wireless AP 2310 can be utilized by one or more MDs at or above a specific speed for a MD. In one example, the signal can indicate that wireless AP 2310 can be utilized at any speed. In second example, the signal can include speed information that can be utilized by a MD in determining if network communications via wireless AP 2310 are possible. For instance, the signal can include a speed of wireless AP 2310 that can be utilized by a MD in determining if network communications via wireless AP 2310 are possible. In another example, the signal can include direction information that can be utilized by a MD in determining if network communication via wireless AP 2310 is possible.

In one or more embodiments, the signal can be included in an IEEE 802.11 beacon. In one example, the IEEE 802.11 beacon can include a service set identifier (SSID). In a second example, the IEEE 802.11 beacon can include a beacon frame. In one instance, the beacon frame can include capability information that can include speed information, associated with wireless AP 2310, that can be utilized by a MD in determining if network communications via wireless AP 2310 are possible. In another instance, the beacon frame can include information that can indicate that wireless AP 2310 can be utilized at any speed.

Figure 3:
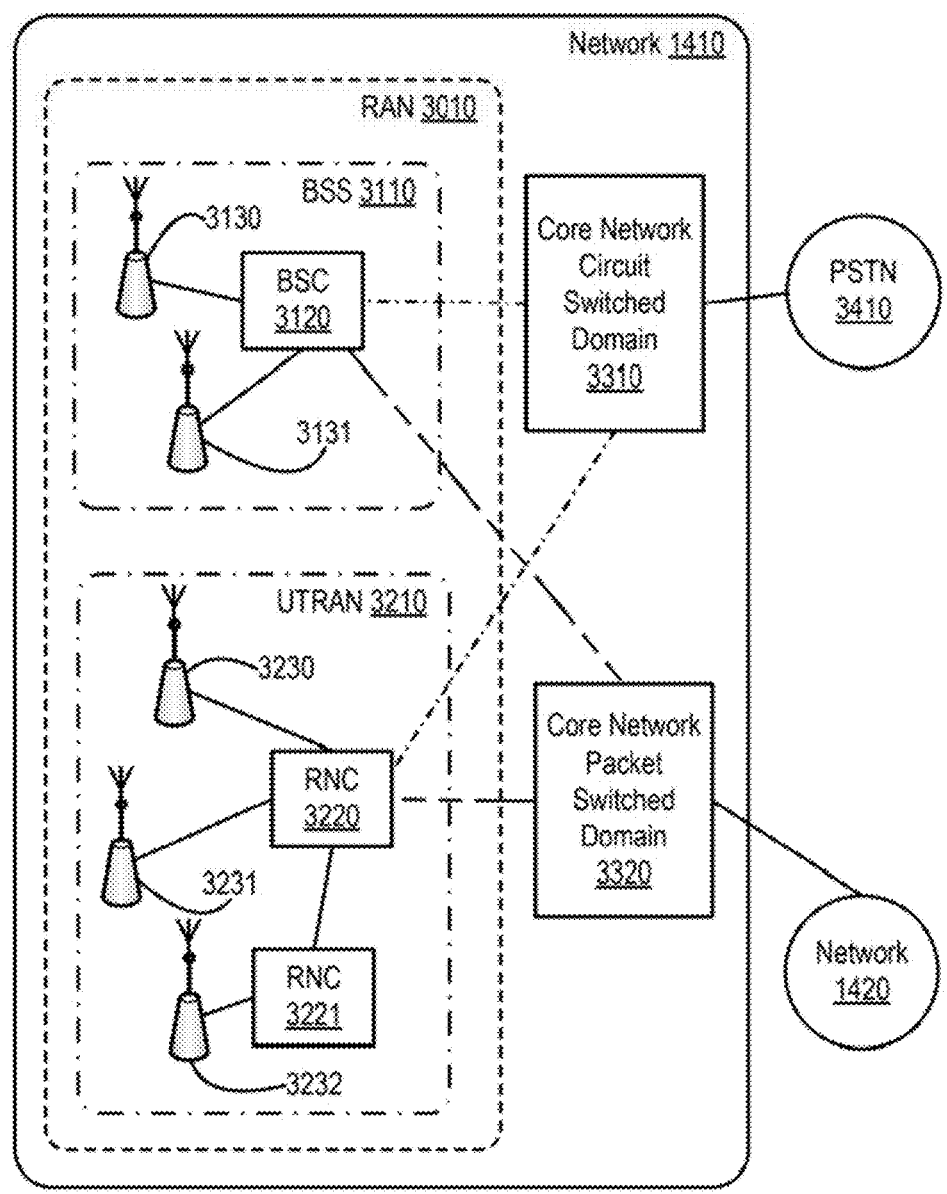
FIG. 3 provides a block diagram of one or more network communications systems, according to one or more embodiments.

Turning now to FIG. 3, a block diagram of one or more network communications systems is illustrated, according to one or more embodiments. In one or more embodiments, network 1410 can include one or more communications systems that can be based on one or more standards such as one or more of 3GPP (3rd Generation Partnership Project), 3GPP (3rd Generation Partnership Project 2), WiMax, and a future evolved mobile communication network standard. As shown, network 1410 can include a radio access network (RAN) 3010 that can include a base station subsystem (BSS) 3110. As illustrated, BSS 3110 can include a base station controller (BSC) 3120 and one or more base transceiver stations (BTSes) 3130 and 3131 that can be coupled to BSC 3120. In one or more embodiments, a base transceiver station (BTS) can include one or more transmitters, one or more receivers, one or more transceivers, one or more antennas, and/or one or more cryptography devices that can be used to communicate with one or more mobile devices 1110-1112 and BSC 3120. For example, the one or more transmitters, the one or more receivers, and/or the one or more transceivers of the BTS can communicate via a layer one of an air interface (e.g., a wireless interface). In one or more embodiments, the one or more antennas of the BTS can be mounted on a roof of a building, on a mast, on a tower (e.g., a cellular telephone communications tower), and/or on a side of a structure (e.g., a building, a parking garage, a lamp post, etc.). In one or more embodiments, a BTS of BTSes 3130 and 3131 can be or include a MTN node of MTN nodes 1210-1212.

As illustrated, BSC 3120 can be coupled to one or more of a core network circuit switched domain 3310 and a core network packet switched domain 3320. As shown, core network circuit switched domain 3310 and core network packet switched domain 3320 can be respectively coupled to a PSTN 3410 and network 1420. In one or more embodiments, BSC 3120 can communicate telephonic and/or circuit switched data via core network circuit switched domain 3310 to PSTN 3410 and/or packet switched data (e.g., IP data) via core network packet switched domain 3320 to network 1420.

As shown, RAN 3010 can include a universal mobile telecommunications system (UMTS) terrestrial radio access network (UTRAN) 3210. As illustrated, UTRAN 3210 can include one or more radio network controllers (RNCs) 3220 and 3221, one or more Node Bs 3230 and 3231 coupled to radio network controller (RNC) 3220, and a Node B 3232 coupled to RNC 3221 which can be coupled to RNC 3220. In one or more embodiments, a Node B can denote and/or include a base transceiver station in a UMTS and can include one or more transmitters, one or more receivers, one or more transceivers, and/or one or more antennas. In one example, a Node B can utilize a wideband code division multiple access (WCDMA) and/or a time division synchronous code division multiple access (TD-SCDMA) in implementing an air interface (e.g., wireless interface) with one or more mobile devices. In another example, a Node B can be controlled by a RNC (e.g., Node B 3232 can be controlled by RNC 3221). In one or more embodiments, the one or more antennas of the Node B can be mounted on a roof of a building, on a mast, on a tower (e.g., a cellular telephone communications tower), and/or on a side of a structure (e.g., a building, a parking garage, a lamp post, etc.). In one or more embodiments, a Node B of Node Bs 3230-3232 can be or include a MTN node of MTN nodes 1210-1212.

As illustrated, RNC 3220 can be coupled to one or more of core network circuit switched domain 3310 and core network packet switched domain 3320. In one or more embodiments, RNC 3220 can communicate telephonic and/or circuit switched data via core network circuit switched domain 3310 to PSTN 3410 and/or packet switched data (e.g., IP data) via core network packet switched domain 3320 to network 1420. In one or more embodiments, RNC 3221 can be coupled to RNC 3220, and RNC 3221 can communicate telephonic and/or circuit switched data with PSTN 3410 via RNC 3220 and/or packet switched data (e.g., IP data) with network 1420 via RNC 3220.

Figure 4:
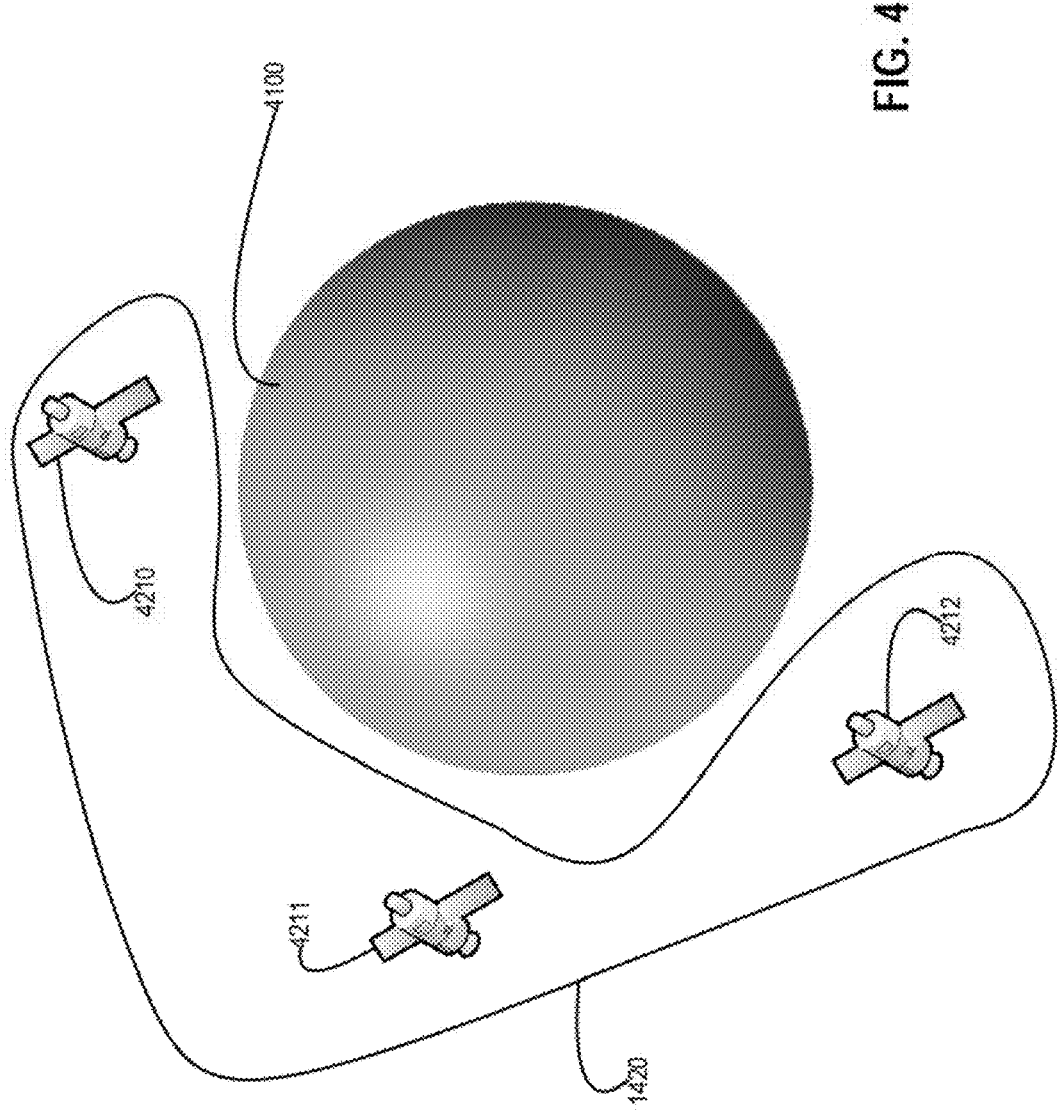
FIG. 4 provides a block diagram of one or more network communications systems and a planet, according to one or more embodiments.

Turning now to FIG. 4, a block diagram of one or more network communications systems and a planet is illustrated, according to one or more embodiments. As shown, network 1410 can include one or more MTN nodes 4210-4212 that can orbit a planet 4100. In one example, one or more MTN nodes 4210-4212 can be or include one or more respective satellites that can orbit planet 4100 (e.g., Earth). For instance, one or more MTN nodes 4210-4212 can orbit planet 4100 in a geosynchronous orbit, a semi-synchronous orbit, a low planetary orbit (e.g., a low Earth orbit), a medium planetary orbit (e.g., a medium Earth orbit), a geostationary orbit, or a high planetary orbit (e.g., a high Earth orbit), among others. In a second example, a MTN node of MTN nodes 4210-4212 can be or include a MTN node of MTN nodes 1210-1212. In another example, a MTN node of MTN nodes 4210-4212 include one or more structures and/or one or more functionalities of a MTN node of MTN nodes 1210-1212.

Figure 5:
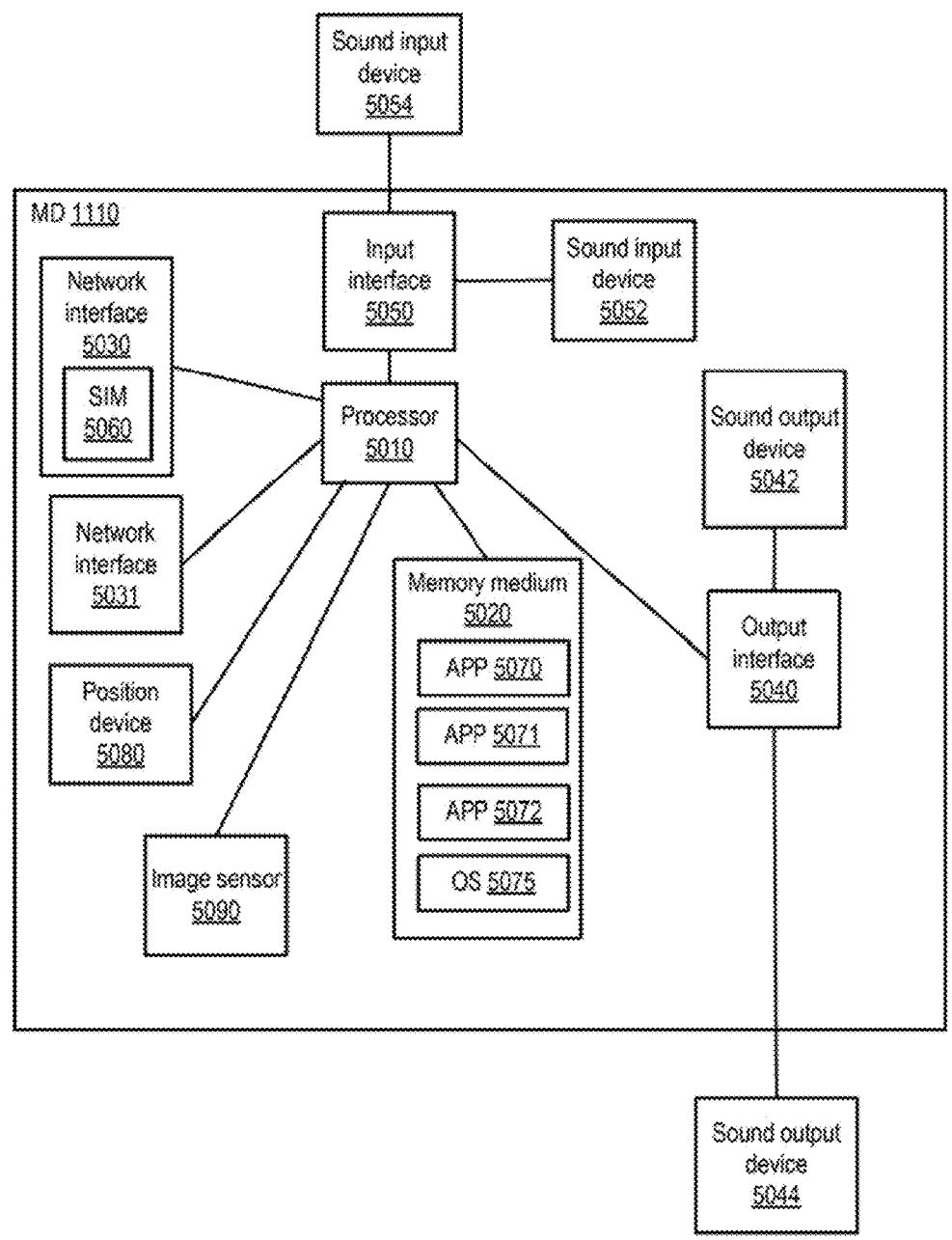
FIG. 5 provides a block diagram of a mobile device, according to one or more embodiments.

Turning now to FIG. 5, a block diagram of a mobile device is illustrated, according to one or more embodiments. As shown, MD 1110 can include a memory medium 5020 coupled to a processor 5010, and MD 1110 can include network interfaces 5030 and 5031, a user output interface 5040, a user input interface 5050, a position device 5080, and an image sensor 5090 coupled to processor 5010. In one or more embodiments, memory medium 5020 can include one or more applications (APPs) 5070-5072 and/or operating system (OS) 5075 that can include instructions executable by processor 5010 to implement one or more methods and/or one or more systems associated with MD 1110. In one or more embodiments, MD 1110 may be any of various types of devices, including a computer system, such as a portable computer, a personal digital assistant (PDA), a tablet computing device, a mobile telephone (e.g., a cellular telephone, a satellite telephone, etc.), a wearable computing device, an Internet appliance, a communications device, a handheld mobile computing device, or other mobile wireless device. In one or more embodiments, processor 5010 can include one or more cores, and each core of processor 5010 can implement an instruction set architecture (ISA).

In one or more embodiments, user output interface 5040 can be used to convey information (e.g., text, graphic, video, haptic, audio, etc.) to a user of MD 1110. For example, MD 1110 may include a display (e.g., a display screen) that can be used to convey text, graphic, image, motion picture, and/or video information to a user of MD 1110. In one or more embodiments, MD 1110 can include a sound output device 5042 coupled to user output interface 5040. In one or more embodiments, sound output device 5042 can include a device and/or circuitry that can produce one or more sounds.

In one or more embodiments, user output interface 5040 can be coupled to a sound output device 5044. In one instance, sound output device 5044 can include one or more of an amplifier and/or a speaker. In another instance, sound output device 5044 can include one or more earphones. In one or more embodiments, user output interface 5040 can be coupled to sound output device 5044 in a wired fashion. In one or more embodiments, user output interface 5040 can be coupled to sound output device 5044 in a wireless fashion. In one example, user output interface 5040 can communicate sound information to output device 5044 using an ISM (industrial, scientific, measurement) band. For instance, user output interface 5040 can communicate sound information to sound output device 5044 using one or more of a personal are network (PAN), IEEE 802.15, IEEE 802.15.4, ZigBee, 6LoWPAN, frequency modulation of a carrier wave, amplitude modulation of a carrier wave, light signals, and serial pulses, among others. In one or more embodiments, sound output device 5044 can be or be included in a device that includes an IEEE 802.15 receiver or transceiver, such as a Bluetooth headset or earpiece.

In one or more embodiments, user input interface 5050 can be used to receive sounds from a user of MD 1110. In one example, MD 1110 can include a sound input device 5052 coupled to user input interface 5050. In one instance, sound input device 5052 can include a microphone. In another example, a sound input device 5054 coupled to user input interface 5050. In one or more embodiments, a sound input device can include a device and/or circuitry that can receive one or more sounds and transform the one or more sounds into one or more electrical signals (e.g., voltage and/or current). In one or more embodiments, a sound input device can include an acoustic to electric transducer or sensor that can convert one or more sounds into one or more electrical signals. For example, the acoustic to electric transducer or sensor can include a body (e.g., a diaphragm, a crystal, a ceramic, etc.) that can vibrate in response to one or more sounds (e.g., in response to sound pressure), and movement of the body can be transformed and/or converted into one or more electrical signals. For instance, a sound input device can include a microphone. In one or more embodiments, a microphone can use one or more of capacitance change (e.g., a condenser microphone), electromagnetic induction (e.g., a dynamic microphone), piezoelectric generation, and light modulation to produce one or more electrical signal from one or more mechanical vibrations.

In one or more embodiments, user input interface 5050 can be coupled to sound input device 5054 in a wired fashion. In one or more embodiments, user input interface 5050 can be coupled to sound input device 5054 in a wireless fashion. In one example, user input interface 5050 can communicate sound information to sound input device 5054 using an ISM band. For instance, sound input device 5054 can communicate sound information to user input interface 5050 using one or more of a PAN, IEEE 802.15, IEEE 802.15.4, ZigBee, 6LoWPAN, frequency modulation of a carrier wave, amplitude modulation of a carrier wave, light signals, and serial pulses, among others. In one or more embodiments, sound input device 5054 can be or be included in a device that includes an IEEE 802.15 transmitter or transceiver, such as a Bluetooth headset or microphone.

In one or more embodiments, user input interface can be used to receive user input from a user of MD 1110. In one example, MD 1110 may include a keyboard that can be used to receive user input from a user of MD 1110. In another example, MD 1110 may include one or more sensors that can be used to receive user input from a user of MD 1110. In one instance, one or more sensors can include resistive sensors that can be used to determine one or more positions on a display screen. In another instance, one or more sensors can include capacitive sensors that can be used to determine one or more positions on a display screen. In one or more embodiments, user output interface 5040 and user input interface 5050 can be used to implement a keyboard. For example, user output interface 5040 can be used to present an image of a keyboard, and user input interface 5050 can receive a position of user input on the image of the keyboard to determine a received key of the keyboard.

In one or more embodiments, network interface 5030 can include a transceiver that is operable to communicate information with network 1410. For example, network interface 5030 can enable MD 1110 to communicate with a MTN node (e.g., a MTN node of MTN nodes 1210-1212 and 4210-4212). In one or more embodiments, network interface 5030 can be used to couple MD 1110 to network 1410, and MD 1110 can use network interface 5030 to communicate information (e.g., data, voice data, etc.) with network 1410. In one or more embodiments, network interface 5030 can include a subscriber identity module (SIM) 5060.

In one or more embodiments, SIM 5060 can securely store an international mobile subscriber identity (IMSI) which can include a unique number and/or identity associated with a GSM network and/or a UMTS network. In one example, the unique number and/or identity can be used to determine information corresponding to MD 1110 from a home location register (HLR) and/or from a visitor location register (VLR). In one or more embodiments, a MSISDN (mobile subscriber ISDN (integrated services digital network) number, mobile station international ISDN number (s), or mobile international ISDN number) can be a number that can uniquely identify a subscription in a GSM mobile network and/or a UMTS (universal mobile telecommunications system) mobile network. For example, the MSISDN can include a telephone number corresponding to SIM 5060. In one instance, the MSISDN can include a country code, a national destination code, and a subscriber number. In another instance, the MSISDN can include a country code, a number planning area, and a subscriber number.

In one or more embodiments, SIM 5060 can be embodied in a removable card (e.g., a SIM card) that can be removed from a first MD associated with a first subscriber account and placed in a second MD, so that the second MD can be associated with the first subscriber account. For example, SIM 5060 embodied as a SIM card can be associated with a first subscriber account and used in MD 1110, thereby associating MD 1110 with the first subscriber account; SIM 5060 can be removed from MD 1110, thereby disassociating MD 1110 with the first subscriber account; and SIM 5060 can be placed in MD 1111, thereby associating MD 1111 with the first subscriber account.

In one or more embodiments, network interface 5031 can be used to communicate with a wireless AP (e.g., a wireless AP of wireless APs 1310-1315 and 2310). For example, network interface 5031 can include a transceiver that is operable to communicate information with a wireless AP. In one instance, network interface 5031 can be configured and used to communicate with one or more wireless APs 1310-1315 and 2310 utilizing IEEE 802.11. In another instance, network interface 5031 can be configured and used to communicate with one or more wireless APs 1310-1315 and 2310 utilizing IEEE 802.16.

In one or more embodiments, MD 1110 can include a position device 5080 coupled to processor 5010. In one example, position device 5080 can include a global positioning system (GPS) receiver. In another example, position device 5080 can include a terrestrial radio navigation system receiver such as LORAN (LOng RAnge Navigation). In one or more embodiments, position device 5080 can provide one or more services such as one or more of positioning, navigation, and timing to processor 5010. In one example, a positioning service can provide one or more of latitude information, longitude information, altitude information, speed information, and accuracy information (e.g., a radius of uncertainty for a geographic location or position).

In one or more embodiments, position device 5080 can provide heading (e.g., direction) direction information. For example, position device 5080 can include a compass and/or implement a compass to provide heading information. In one or more embodiments, position device 5080 can provide device position information such as tilt and/or angle information. For example, position device 5080 can include one or more of an accelerometer and an electronic gyroscope. In one or more embodiments, the compass can be electronically gimbaled using one or more of an accelerometer and an electronic gyroscope.

In one or more embodiments, electronic image sensor 5090 can provide digital data of one or more of an image, a motion picture, and a video. For example, electronic image sensor 5090 can be or include a digital camera. In one or more embodiments, the digital data of one or more of an image, a motion picture, and a video can include one or more formats. For example the one or more formats can include one or more of a tagged image file format (TIFF), a joint photographic experts group (JPEG) format, an exchangeable image file format (EXIF), a RAW format, a portable network graphics (PNG) format, a graphic interchange format (GIF), a bitmap (BMP) format, and a vector file format, among others. In one or more embodiments, one or more of MDs 1111 and 1112 can include same or similar structures and/or functionalities of those described with reference to MD 1110.

Figure 6:
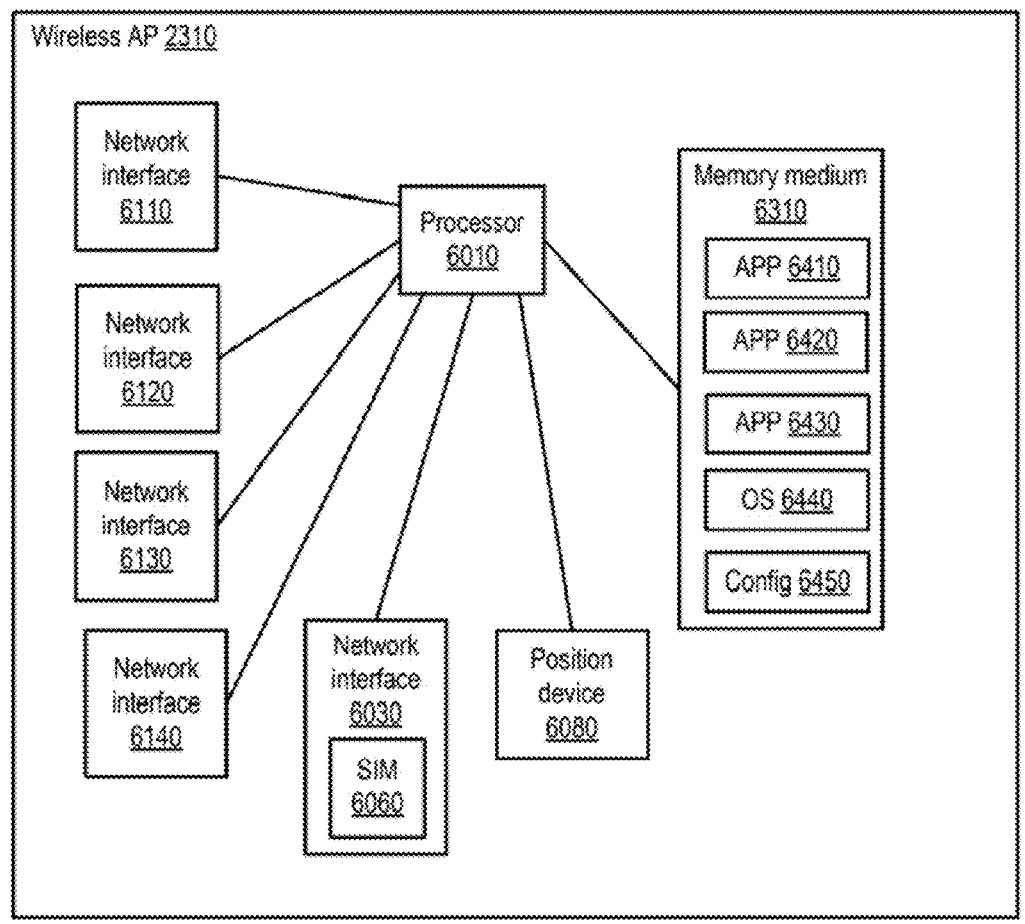
FIG. 6 provides a block diagram of a wireless access point, according to one or more embodiments.

Turning now to FIG. 6, a block diagram of a wireless access point is illustrated, according to one or more embodiments. As shown, wireless AP 2310 can include a memory medium 6310 coupled to a processor 6010, and wireless AP 2310 can include one or more network interfaces 6110-6140 coupled to processor 6010. In one or more embodiments, a network interface (e.g., a network interface from network interfaces 6110-6140) can be coupled to network 1420. In one example, network interface 6110 can implement an Ethernet interface that is operable to be coupled to a cable modem, a router, or a DSL modem, among others, where the cable modem, the router, or the DSL modem is operable to be coupled to network 1420. In another example, network interface 6110 can implement a WiMax network interface that is operable to be coupled to a WiMax access point that is operable to be coupled to network 1420.

In one or more embodiments, a network interface (e.g., a network interface from network interfaces 6110-6140) can be coupled to one or more devices (e.g., one or more of MDs 1110-1112, etc.), in a wireless fashion. In one example, network interface 6120 can implement an IEEE 802.11 interface that can wirelessly communicate with one or more devices (e.g., one or more of MDs 1110-1112). In a second example, network interface 6130 can implement an IEEE 802.15.4 interface that can wireless communicate with one or more devices (e.g., one or more of MDs 1110-1112). In another example, network interface 6140 can implement a wireless USB interface that can wireless communicate with one or more devices (e.g., one or more of MDs 1110-1112 and 1310). In one or more embodiments, wireless AP 2310 can provide wireless local area network access via at least one wireless network interface of wireless network interfaces 6120-6140. For example, wireless AP 2310 can provide a wireless local area network to one or more of MDs 1110-1112 via wireless network interface 6120.

As illustrated, wireless AP 2310 can include a network interface 6030 coupled to processor 6010, and network interface 6030 can include a SIM 6060. In one or more embodiments, network interface 6030 and SIM 6060 can include one or more same or similar structures and/or functionalities of those described with reference to network interface 5030 and SIM 5060, respectively. As shown, wireless AP 2310 can include a position device 6080 coupled to processor 6010. In one or more embodiments, position device 6080 can include one or more same or similar structures and/or functionalities of those described with reference to position device 5080.

As shown, memory medium 6310 can include one or more APPs 6410-6430, an OS 6440, and/or a configuration 6450. In one or more embodiments, one or more of APPs 6410-6430 and/or OS 6440 can be executable by processor 6010 to implement one or more systems, processes, and/or methods described herein. In one or more embodiments, configuration 6450 can include network information and/or routing information associated with network elements and/or devices coupled to wireless AP 2310. In one or more embodiments, one or more of wireless APs 1310-1315 can include one or more same or similar structures and/or functionalities of those described with reference to wireless AP 2310.

Figure 7:
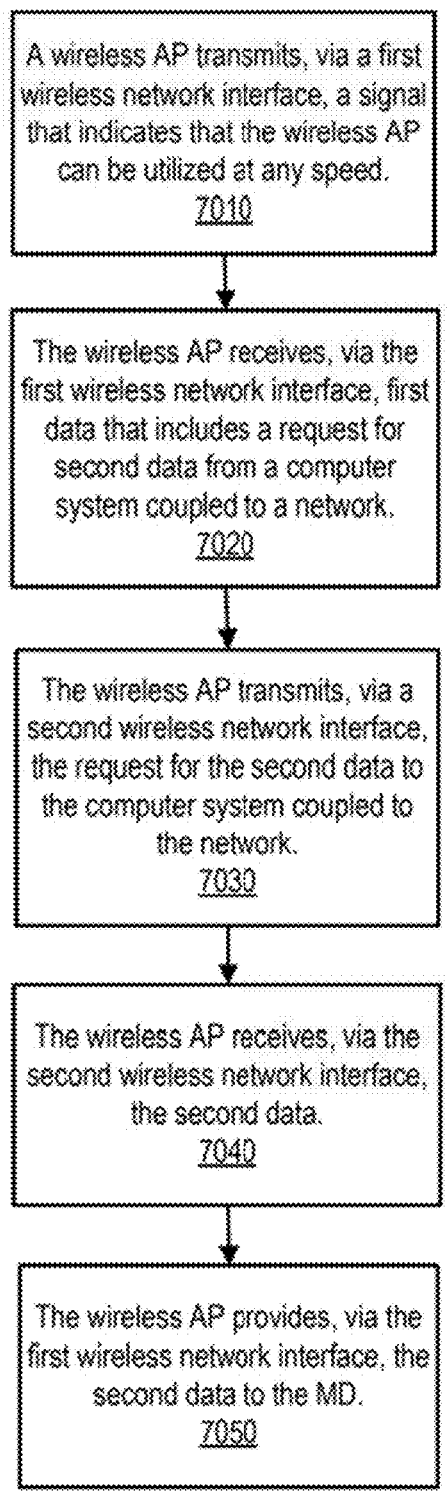
FIG. 7 illustrates a method of operating a wireless access point, according to one or more embodiments.

Turning now to FIG. 7, a method of operating a wireless access point is illustrated, according to one or more embodiments. At 7010, a wireless AP can transmit, via a first wireless network interface, a signal that indicates that the wireless AP can be utilized at any speed. In one example, wireless AP 2310 can transmit a signal indicating that it can be utilized at any speed. For instance, wireless AP 2310 can transmit the signal via network interface 6120. In a second example, a WLAN can be implemented for utilization by one or more MDs that can travel at any speed (e.g., low speed, high speed, etc.), and wireless AP 2310 can transmit a signal indicating that it can be utilized at any speed. In one or more embodiments, the signal can be included in IEEE 802.11 beacon. In one example, the IEEE 802.11 beacon can include a SSID. In a second example, the IEEE 802.11 beacon can include a management frame (e.g., a beacon frame). For instance, the management frame can include information, indicating that wireless AP 2310 can be utilized at any speed, which can be utilized by a MD in determining if network communications via wireless AP 2310 are possible.

At 7020, the wireless AP can receive, from at least one MD and via the first wireless network interface, first data that includes a request for second data from a computer system coupled to a network. For example, wireless AP 2310 can receive, from MD 1110 and via network interface 6120, first data that includes a request for second data from computer system 1630 coupled to network 1420. At 7030, the wireless AP can transmit, via a second wireless network interface, the request for the second data to the computer system. For example, wireless AP 2310 can transmit, via network interface 6030, the request for the second data to computer system 1630. For instance, wireless AP 2310 can transmit the request for the second data to computer system 1630 via network 1410 and network 1420.

In one or more embodiments, transmitting the request for the second data to computer system 1630 via network 1410 and network 1420 can include the request for the second data to computer system 1630 via a MTN node (e.g., a MTN node of MTN nodes 1210-1212). For example, wireless AP 2310 can transmit the request to MTN 1210 via one or more IP packets that include a destination address of computer system 1630. For instance, the destination address of computer system 1630 can include an IP address of computer system 1630.

At 7040, the wireless AP can receive, via the second wireless network interface, the second data. For example, wireless AP 2310 can receive, via network interface 6030, the second data from computer system 1630. For instance, wireless AP 2310 can receive the second data from computer system 1630 via one or more of network 1420, network 1410, and a MTN node (e.g. a MTN node of MTN nodes 1210-1212). At 7050, the wireless AP can provide, via the first network interface, the second data to the at least one MD. For example, wireless AP 2310 can provide, via network interface 6120, the second data to MD 1110.

Figure 8:
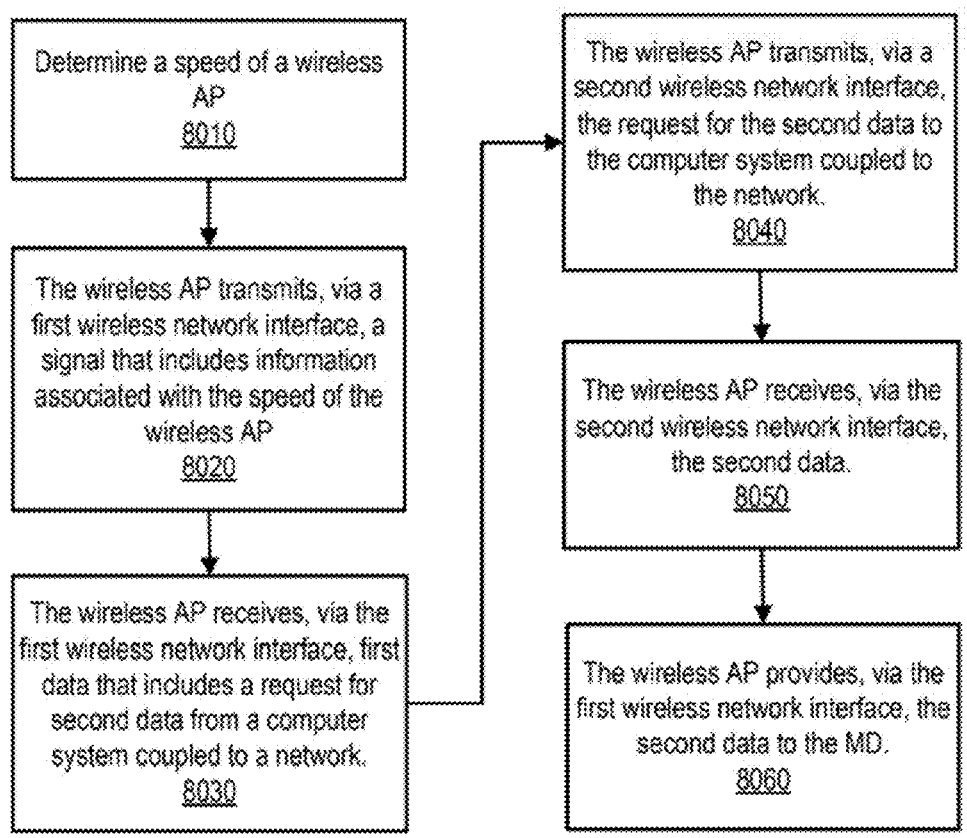
FIG. 8 illustrates a method of operating a wireless access point that is configured to transmit its speed via a wireless network interface, according to one or more embodiments.

Turning now to FIG. 8, a method of operating a wireless access point that is configured to transmit its speed via a wireless network interface is illustrated, according to one or more embodiments. At 8010, a speed of a wireless AP can be determined. In one example, wireless AP 2310 can determine its speed via position device 6080. In another example, one or more computer systems 1610-1622 can determine a speed of wireless AP 2310. For instance, wireless AP 2310 can receive its speed, as determined by one or more of computer systems 1610-1622, via network interface 6030.

At 8020, a wireless AP can transmit, via a first wireless network interface, a signal that includes information associated with the speed of the wireless AP. In one example, wireless AP 2310 can transmit, via wireless network interface 6120, a signal that indicates that wireless AP 2310 can be utilized by one or more of MDs 1110-1112 at or above a speed. In another example, wireless AP 2310 can transmit, via wireless network interface 6120, a signal that indicates that the speed of wireless AP 2310. In one or more embodiments, the signal can be included in IEEE 802.11 beacon. In one example, the IEEE 802.11 beacon can include a SSID. In a second example, the IEEE 802.11 beacon can include a management frame (e.g., a beacon frame). For instance, the management frame can include information indicating the speed of wireless AP 2310. In one or more embodiments, method elements 8030-8060 can be performed with reference to method elements 7020-7050 (of FIG. 7), respectively.

Figure 9:
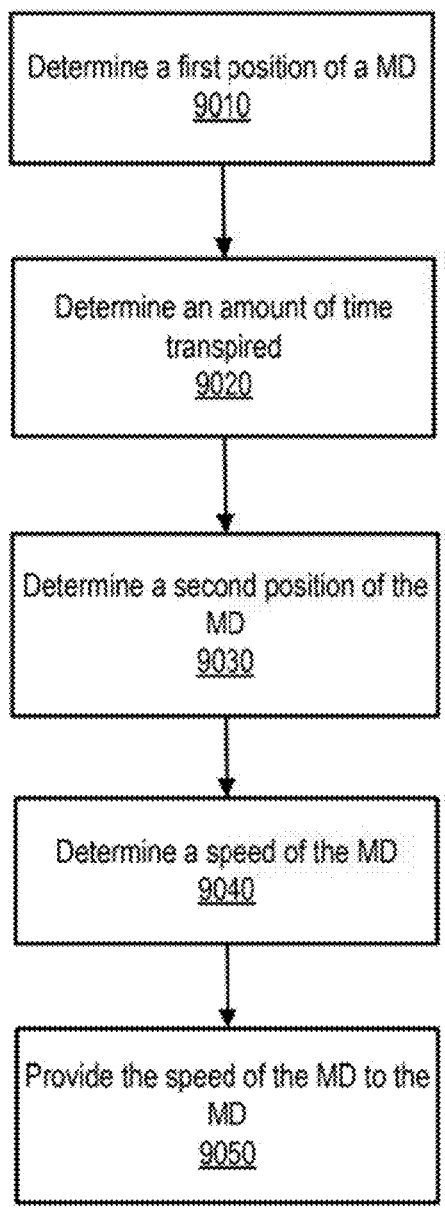
FIG. 9 illustrates a method of determining speed information associated with a mobile device, according to one or more embodiments.

Turning now to FIG. 9, a method of determining speed information associated with a mobile device is illustrated, according to one or more embodiments. At 9010, a first position of a MD (e.g., a MD of MDs 1110-1112) can be determined. For example, one or more computer systems (e.g., one or more of computer systems 1610-1622) can determine the position of MD 1110. In one or more embodiments, the position of the MD can be associated with position information (e.g., latitude, longitude, altitude, etc.), and the one or more computer systems can determine the position information associated with the position of the MD.

In one example, position information can be determined using a triangulation system, method, and/or process. In one instance, at least three antennas of at least three respective base transceiver stations included in or coupled to network 1410 can receive one or more signals from the MD, and strength of the one or more signals and/or timing the signal propagation from the MD to the at least three antennas of at least three respective base transceiver stations can be used in determining the position information. In another instance, at least two directional antennas of at least two respective base transceiver stations included in or coupled to network 1410 can receive one or more signals from the MD, and strength of the one or more signals and/or timing the signal propagation from the MD to the at least two antennas of at least two respective base transceiver stations can be used in determining the position information.

In one or more embodiments, strength of a signal from the MD to an antenna of a base transceiver station (e.g., a MTN node) included in or coupled to network 1410 can be utilized in determining the position information. For example, a first strength of a signal transmitted from the MD can be different from a second strength of the signal received by the antenna, and a distance from the antenna can be determined based on a difference in transmitted strength of the signal and received strength of the signal. For instance, one or more computer systems 1610-1622 can communicate a signal to the MD, where the signal includes information that indicates the first signal strength, and the MD can transmit one or more signals, at or close to the first signal strength, to network 1410. Network 1410 can receive, at the second signal strength, the one or more signals transmitted by the MD, where the second signal strength is less than the first signal strength due to path loss, terrain, etc.

Since the first signal strength can depend on free space path loss, air path loss, terrain path loss (e.g., hills, valleys, mountains, vegetation, etc.), and/or structure path loss (e.g., buildings, bridges, towers, etc.), among others, a data structure that includes information associated with these dependencies can be utilized in determining a path loss attenuation factor and/or the position based on signal strength, according to one or more embodiments. In one example, a received first signal strength from MD 1110 at a first position and a second received signal strength from MD 1111 at a second, different, position can be the same or similar while distances of the first and second positions to respective first and second antennas of a base transceiver station can be different. For instance, a distance from the second position to the second antenna of the base transceiver station can be greater than a distance from the first position to the first antenna of the base transceiver station, and the second received signal strength from MD 1111 can be affected by air path loss while the first received signal strength from MD 1110 can be affected by structure path loss.

In one or more embodiments, utilizing sector information associated with the first and second antennas and the data structure that includes information associated with one or more of free space path loss, air path loss, terrain path loss, and structure path loss can be used and/or aid in determining the differences in the distances by gauging the first and second received signal strengths with path loss information of the data structure. In one or more embodiments, a vicinity of the antenna, that can communicate with a MD, can include a sector of an area or volume covered by the antenna, and the sector can be used in determining the position information. In one or more embodiments, determining the distance from the antenna can be used in determining the position information and/or can be based on determining a path loss attenuation factor. For example, path loss attenuation factor can be based on one or more of free space path loss, air path loss, terrain path loss, and structure path loss.

At 9020, an amount of time transpired can be determined. For example, a computer system of computer systems 1610-1622 can determine that an amount of time has transpired. At 9030, a second position of the MD can be determined. For example, one or more computer systems (e.g., one or more of computer systems 1610-1622) can determine the position of MD 1110. In one or more embodiments, the second position of the MD can be determined similarly to or the same as the first position determined at 9010.

At 9040, a speed of the MD can be determined. For example, a computer system of computer systems 1610-1622 can calculate a speed of MD 1110 by calculating a distance between the first position and the second position that has been traversed within the amount of time that has transpired. In one or more embodiments, a computer system of computer systems 1610-1622 can calculate a velocity (e.g., a speed and direction) of a MD by calculating a distance between the first position and the second position that has been traversed within the amount of time that has transpired. At 9050, the speed of the MD can be provided to the MD. For example, MTN node 1210 can transmit the speed of MD 1110 to MD 1110. In one or more embodiments, a speed of a wireless AP can be determined using the method described with reference to FIG. 9. For example, "a MD" and "MD 1110" can be substituted by "a wireless AP" and "wireless AP 2310", respectively.

Figure 10:
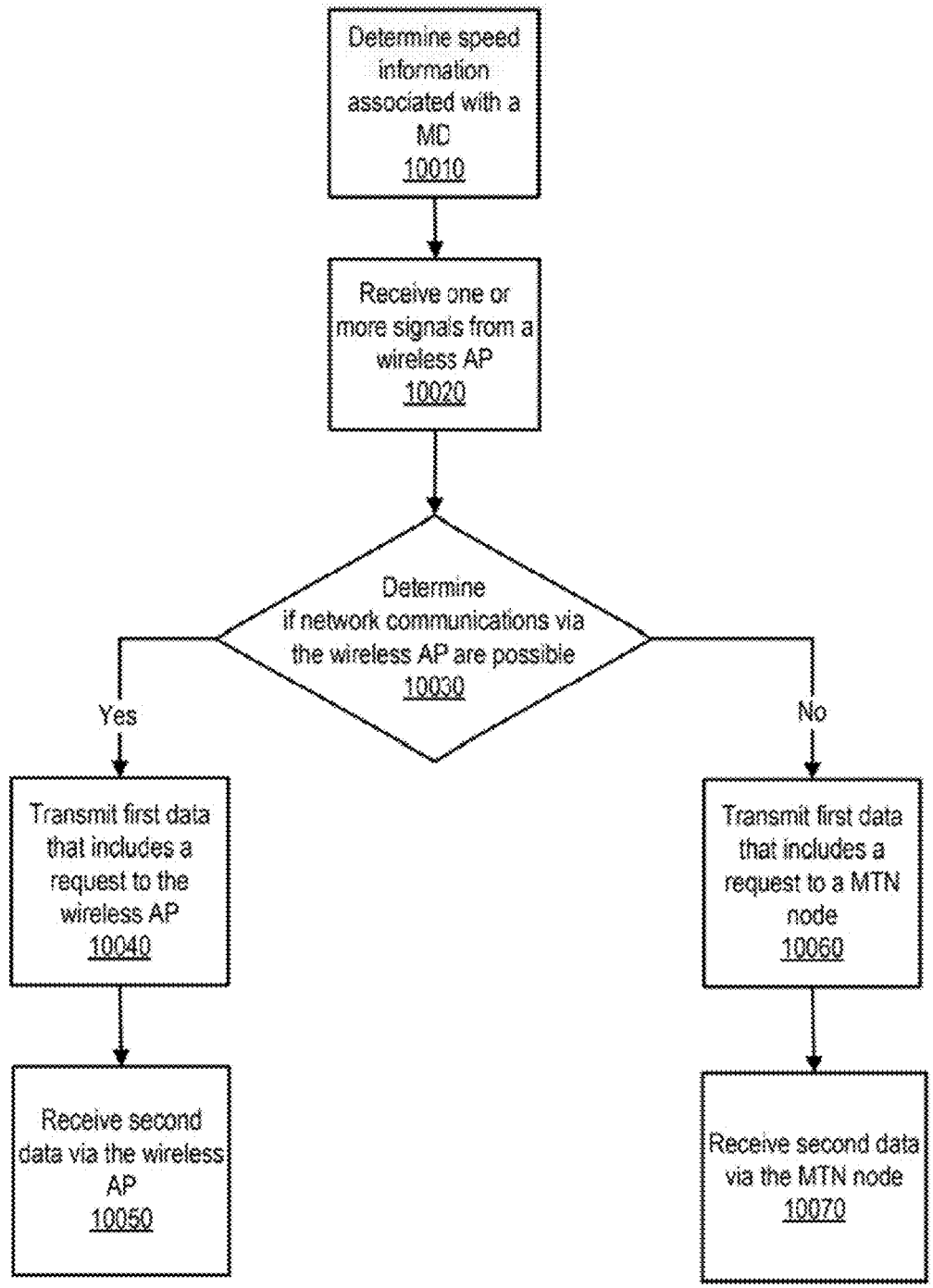
FIG. 10 illustrates a method of operating a mobile device, according to one or more embodiments.

Turning now to FIG. 10, a method of operating a mobile device is illustrated, according to one or more embodiments. At 10010, speed information associated with a MD can be determined. In one example, MD 1110 can determine its speed. For instance, MD 1110 can determine its speed utilizing position device 5080. In another example, MD 1110 can determine its speed by receiving its speed via network 1410 and/or MTN node 1210. At 10020, one or more signals can be received from a wireless AP. For example, MD 1110 can receive one or more signals from wireless AP 2310. At 10030, it can be determined if network communications via the wireless AP are possible.

In one example, determining if network communications via the wireless AP are possible can include determining an amount of time that the wireless AP can be utilized. In one instance, determining if network communications via the wireless AP are possible can include determining if the amount of time for utilizing the wireless AP is too brief (e.g., three seconds). In another instance, determining if network communications via the wireless AP are possible can include determining if the amount of time for utilizing the wireless AP would reduce a quality of service if the MD communicates with the wireless AP. For example, if the amount of time for utilizing the wireless AP would not reduce a quality of service, then network communications utilizing the wireless AP can be considered optimal, and it can be determined that network communications via the wireless AP are possible, since communications utilizing the wireless AP can be considered optimal.

If network communications via the wireless AP are possible, first data that includes a request can be transmitted to the wireless AP, at 10040. For example, MD 1110 can transmit, via network interface 5031, first data that includes a request to wireless AP 2310. In one or more embodiments, the first data can include address information that can be utilized in routing the request and/or the first data to a computer system (e.g., a computer system of computer systems 1630-1632) coupled to a network (e.g., network 1420).

For example, the first data can include one or more IP packets that include a destination address (e.g., an IP address) of a computer system coupled to a network. In one or more embodiments, the request included in the first data can a request for information and/or a request to store and/or transmit information. In one example, the request included in the first data can include a request for a web page from computer system 1630. In second example, the request included in the first data can include a request for email addressed to an email address (e.g., accessible via computer system 1631). In third example, the request included in the first data can include a request to send an email message to a first email address from a second email address. In another example, the request included in the first data can include a request to upload data. For instance, the request can include one or more of a file and data to be inserted into a database.

At 10050, second data can be received from the wireless AP. For example, MD 1110 can receive, via network interface 5031, second data from wireless AP 2310. For instance, the second data can include a response to the request included in the first data. In one example, the response included in the second data can include a web page from computer system 1630. In second example, the response included in the second data can include one or more email messages addressed to an email address (e.g., accessible via computer system 1631). In third example, the response included in the second data can include a confirmation and/or acknowledgement indicating that an email message has been sent or will be sent to a first email address from a second email address. In fourth example, the response included in the second data a confirmation and/or acknowledgement indicating that data has been successfully uploaded. In another example, the response included in the second data an error and/or a negative acknowledgement (NAK) indicating that data has not been successfully uploaded.

If network communications via the wireless AP are not possible, first data that includes a request can be transmitted to a MTN node, at 10060. For example, MD 1110 can transmit, via network interface 5030, first data that includes a request to MTN node 1210. At 10070, second data from the MTN node can be received. For example, MD 1110 can receive, via network interface 5030, second data from MTN 1210. For instance, the second data can include a response to the request included in the first data.

Figure 11:
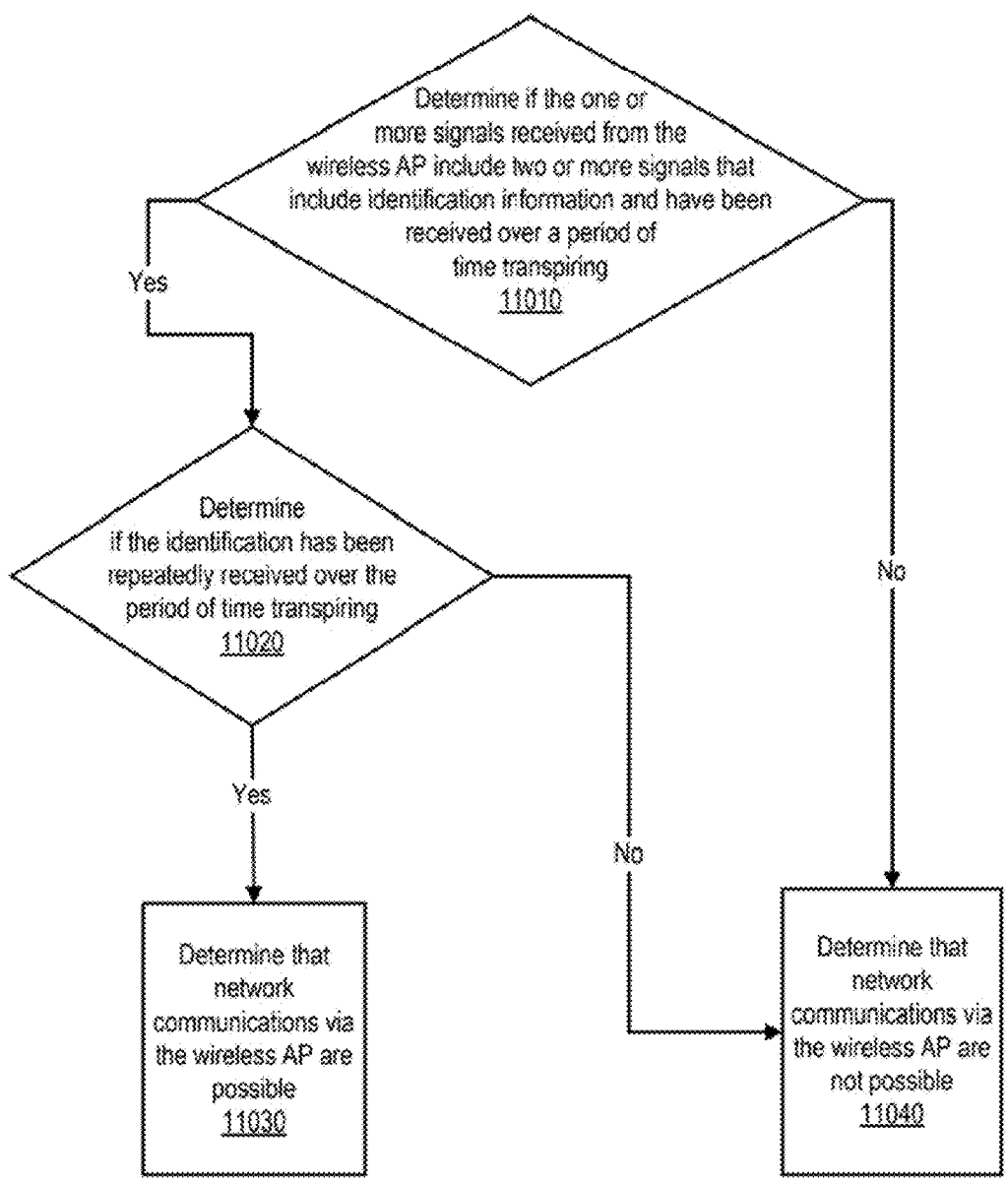
FIG. 11 illustrates a first method of determining if network communications via a wireless access point are possible, according to one or more embodiments.

Turning now to FIG. 11, a method of determining if network communications via a wireless access point are possible is illustrated, according to one or more embodiments. At 11010, it can be determined if the one or more signals received from the wireless AP include two or more signals that include identification information and have been received over a period of time transpiring. In one or more embodiments, the identification information can include one or more of a media access control (MAC) address, a SSID, and a basic service set identifier (BSSID), among others. If the one or more signals received from the wireless AP do not include two or more signals that include identification information or have not been received over the period of time transpiring, it can be determined that network communications via the wireless access point are not possible, at 11040.

If the one or more signals received from the wireless AP include two or more signals that include identification information and have been received over the period of time transpiring, it can be determined if the identification information has been repeatedly received over the period of time transpiring, at 11020. In one example, MD 1110 can receive a same MAC address, a same SSID, and/or a same BSSID over the period of time transpiring. If the identification information has been repeatedly received over the period of time transpiring, it can be determined that network communications via the wireless AP are possible, at 11030. If the identification information has not been repeatedly received over the period of time transpiring, it can be determined that network communications via the wireless access point are not possible, at 11040.

Figure 12:
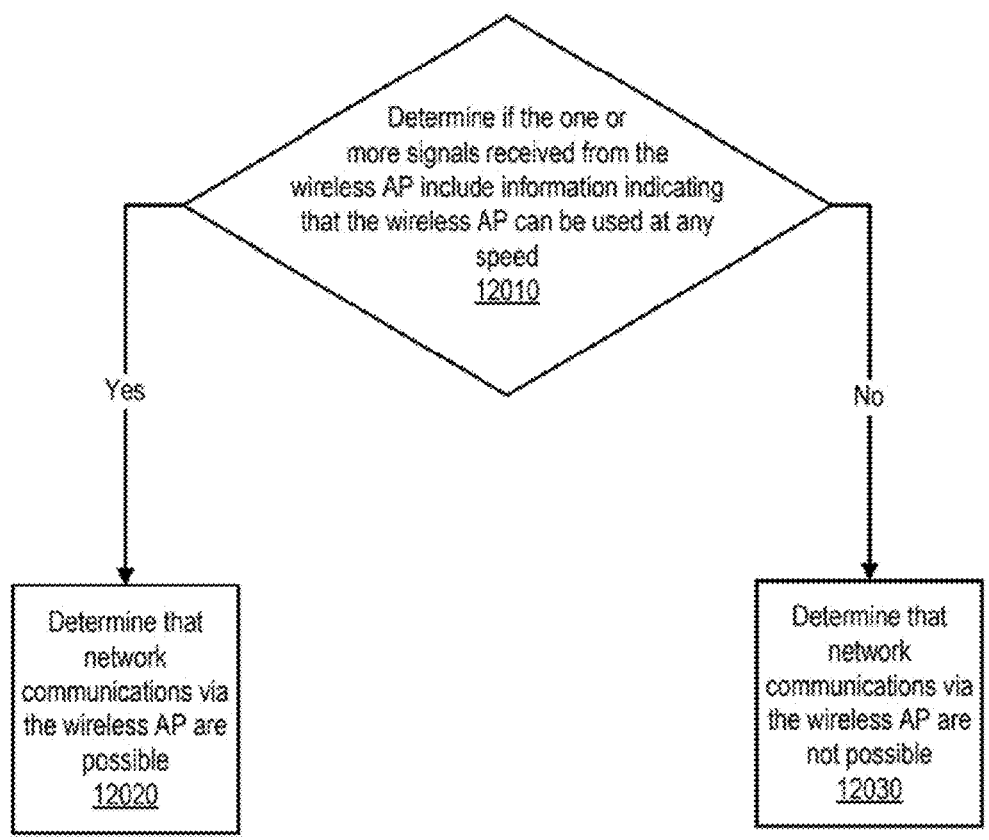
FIG. 12 illustrates a second method of determining if network communications via a wireless access point are possible, according to one or more embodiments.

Turning now to FIG. 12, a method of determining if network communications via a wireless access point are possible is illustrated, according to one or more embodiments. At 12010, it can be determined if the one or more signals received from the wireless AP include information indicating that the wireless AP can be used at any speed. If the one or more signals received from the wireless AP include information indicating that the wireless AP can be used at any speed, it can be determined that network communications via the wireless access point are possible, at 12020. If the one or more signals received from the wireless AP do not include information indicating that the wireless AP can be used at any speed, it can be determined that network communications via the wireless access point are not possible, at 12030.

Figure 13:
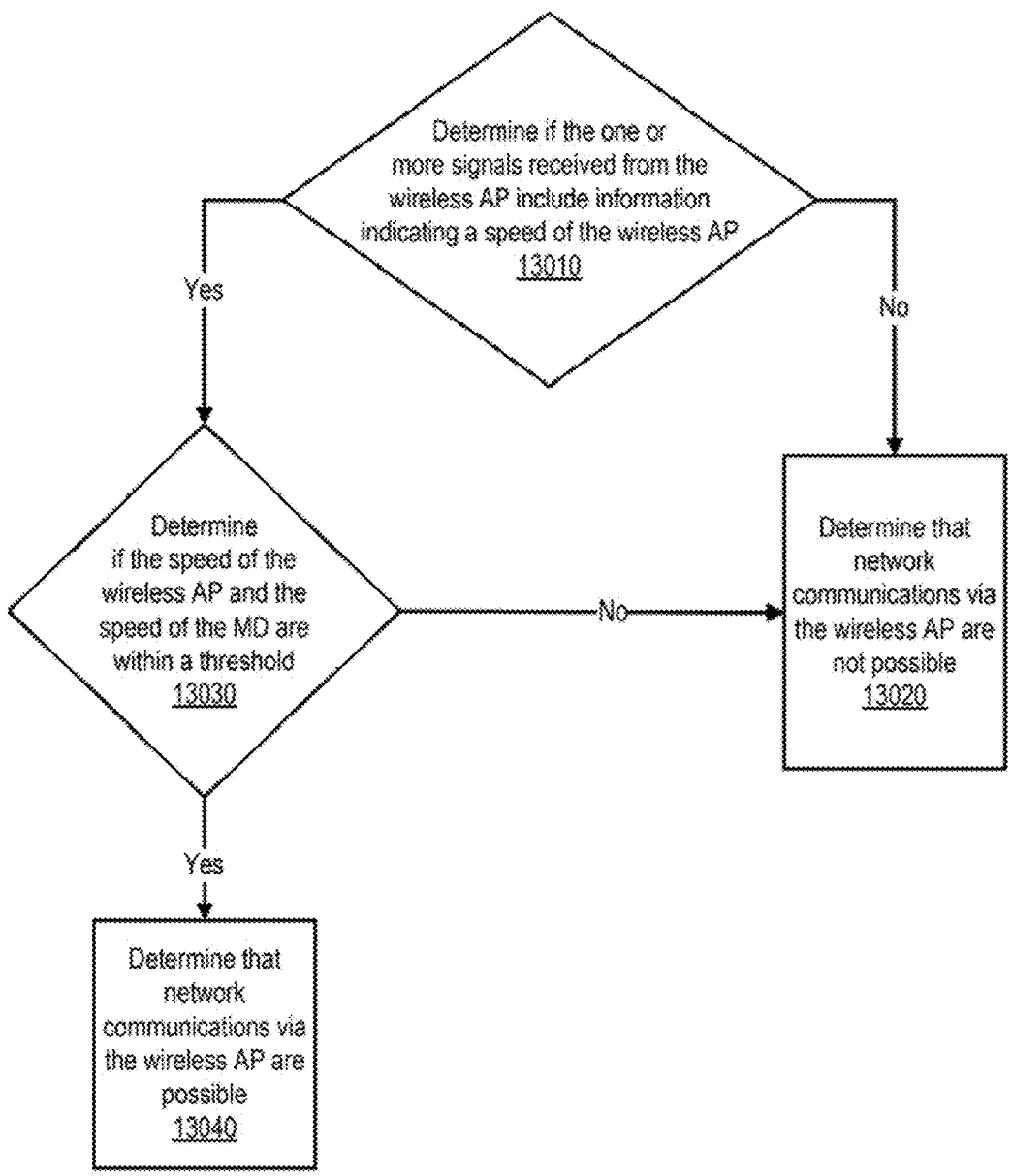
FIG. 13 illustrates a third method of determining if network communications via a wireless access point are possible, according to one or more embodiments.

Turning now to FIG. 13, a method of determining if network communications via a wireless access point are possible is illustrated, according to one or more embodiments. At 13010, it can be determined if the one or more signals received from the wireless AP include information indicating a speed of the wireless AP. If the one or more signals received from the wireless AP do not include information indicating a speed of the wireless AP, it can be determined that network communications via the wireless access point are not possible, at 13020. If the one or more signals received from the wireless AP include information indicating a speed of the wireless AP, it can be determined if the speed of the wireless AP and the speed of the MD are within a threshold, at 13030.

In one or more embodiments, the threshold can indicate a range of relative speeds of a MD to a wireless AP or of a wireless AP to a MD. In one example, it can be determined if the speed of the wireless AP is within plus or minus a threshold of the speed of the MD. In a second example, it can be determined if $|Speed_{AP} - Speed_{MD}| \leq Threshold$ or if $|Speed_{AP} - Speed_{MD}| < Threshold$ (e.g., Threshold=18 MPH). For instance, $|Speed_{AP} - Speed_{MD}|$ can be calculated by calculating $\sqrt{(Speed_{AP} - Speed_{MD})^2}$. If the speed of the wireless AP and the speed of the MD are within the threshold, it can be determined that network communications via the wireless AP are possible, at 13040. If the speed of the wireless AP and the speed of the MD are not within the threshold, it can be determined that network communications via the wireless AP are not possible, at 13020.

Figure 14:
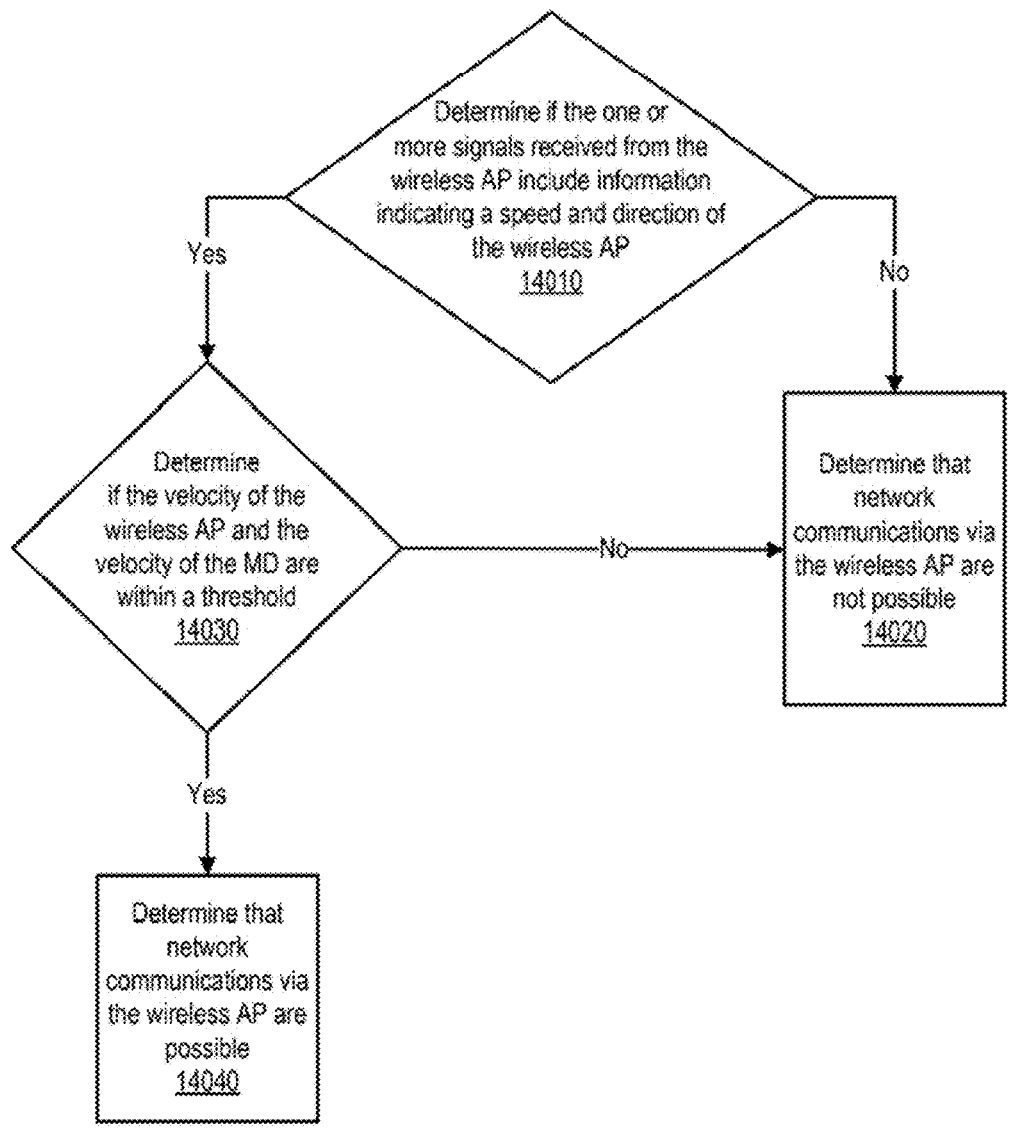
FIG. 14 illustrates another method of determining if network communications via a wireless access point are possible, according to one or more embodiments.

Turning now to FIG. 14, a method of determining if network communications via a wireless access point are possible is illustrated, according to one or more embodiments. At 14010, it can be determined if the one or more signals received from the wireless AP include information indicating a velocity (e.g., a speed and a direction or $\vec{V}_{AP}$) of the wireless AP. If the one or more signals received from the wireless AP do not include information indicating a velocity of the wireless AP, it can be determined that network communications via the wireless access point are not possible, at 14020. If the one or more signals received from the wireless AP include information indicating a velocity (e.g., a speed and a direction or $\vec{V}_{MD}$) of the wireless AP, it can be determined if the velocity of the wireless AP and a velocity of the MD are within a threshold, at 14030.

In one or more embodiments, the threshold can indicate a range of relative speeds and directions of a MD to a wireless AP or of a wireless AP to a MD. For example, a relative speed and direction of the wireless AP to the MD can be calculated via $$\left| \frac{\vec{V}_{AP} \cdot \vec{V}_{MD}}{\|\vec{V}_{MD}\|} - \|\vec{V}_{MD}\| \right|.$$

In one instance, if $$\left| \frac{\vec{V}_{AP} \cdot \vec{V}_{MD}}{\|\vec{V}_{MD}\|} - \|\vec{V}_{MD}\| \right| \leq \text{Threshold (e.g., 18 MPH)},$$

it can be determined that network communications via the wireless AP are possible, at 14040. If $$\left| \frac{\vec{V}_{AP} \cdot \vec{V}_{MD}}{\|\vec{V}_{MD}\|} - \|\vec{V}_{MD}\| \right| > \text{Threshold},$$

it can be determined that network communications via the wireless AP are not possible, at 14020. In another instance, if $$\left| \frac{\vec{V}_{AP} \cdot \vec{V}_{MD}}{\|\vec{V}_{MD}\|} - \|\vec{V}_{MD}\| \right| < \text{Threshold},$$

it can be determined that network communications via the wireless AP are possible, at 14040. If $$\left| \frac{|\vec{V}_{AP} \vec{y}_{MD}|}{\|\vec{V}_{MD}\|} - \|\vec{V}_{MD}\| \right| \geq \text{Threshold},$$

it can be determined that network communications via the wireless AP are not possible, at 14020.

In one or more embodiments, the term "memory medium" can mean a "memory", a "memory device", and/or a "tangible computer readable medium" which is intended to include various types of memory or storage, including an installation medium, e.g., a CD-ROM, or floppy disks, a random access memory or computer system memory such as DRAM, SRAM, EDO RAM, Rambus RAM, NVRAM, EPROM, EEPROM, flash memory etc., and/or a non-volatile memory such as a magnetic media, e.g., a hard drive, and/or optical storage. The memory medium can include other types of memory as well, or combinations thereof. In one or more embodiments, the memory medium can be and/or include an article of manufacture and/or a software product that stores instructions executable by a processor in implementing one or more methods and/or processes described herein. In addition, the memory medium can be located in a first computer in which the programs are executed, or can be located in a second different computer and/or hardware memory device that connects to the first computer over a network. In one or more embodiments, the second computer provides the program instructions to the first computer for execution. The memory medium can also be a distributed memory medium, e.g., for security reasons, where a portion of the data is stored on one memory medium and the remaining portion of the data can be stored on a different memory medium. Also, the memory medium can include one of the networks to which the current network is coupled, e.g., a SAN (Storage Area Network), a NAS (Network Area Storage), a NFS (Network File System), etc.

In one or more embodiments, each of the systems described herein may take various forms, including a personal computer system, server computer system, workstation, network appliance, Internet appliance, wearable computing device, PDA, laptop, mobile telephone, mobile multimedia device, embedded computer system, television system, and/or other device. In general, the terms "processing system", "computing device", "computer", and/or "computer system" can be broadly defined to encompass any device having a processor which executes instructions from a memory medium. A CPU or processing unit in one or more systems executing code and data from a memory medium includes a means for executing one or more software program according to the methods and/or flowcharts described herein.

It is noted that, in one or more embodiments, one or more of the method elements described herein and/or one or more portions of an implementation of a method element can be performed in varying orders, can be repeated, can be performed concurrently with one or more of the other method elements and/or one or more portions of an implementation of a method element, or can be omitted. Additional and/or duplicated method elements can be performed as desired. For example, a process and/or method can perform one or more described method elements concurrently with duplicates of the one or more described method elements. For instance, multiple methods, processes, and/or threads can be implemented using same described method elements.

In one or more embodiments, concurrently can mean simultaneously. In one or more embodiments, concurrently can mean apparently simultaneously according to some metric. For example, two or more method elements and/or two or more portions of an implementation of a method element can be performed such that they appear to be simultaneous to a human. It is also noted that, in one or more embodiments, one or more of the system elements described herein may be omitted and additional system elements can be added as desired.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A method, comprising:
   receiving a beacon signal from a wireless access point at a mobile device;
   determining, based on the beacon signal and a size of a buffer of the mobile device, a speed threshold associated with the wireless access point;
   determining, at the mobile device, a speed of the mobile device relative to the wireless access point;
   performing a comparison of the speed to the speed threshold;
   based on the comparison indicating that the speed satisfies the speed threshold, transmitting data from the mobile device to the wireless access point; and
   based on the comparison indicating that the speed does not satisfy the speed threshold, transmitting the data from the mobile device to a mobile communication network node of a mobile communication network.

2. The method of claim 1, wherein the speed satisfies the speed threshold when the speed is less than the speed threshold.

3. The method of claim 1, wherein the speed satisfies the speed threshold when the speed is greater than the speed threshold.

4. The method of claim 1, wherein the beacon signal further includes speed information that indicates a speed of the wireless access point or a velocity of the wireless access point.

5. The method of claim 1, wherein the beacon signal includes a beacon frame that includes speed information associated with the wireless access point.

6. The method of claim 1, wherein the beacon signal includes an Institute of Electrical and Electronics Engineers 802.11 beacon.

7. The method of claim 1, wherein the data is transmitted to the wireless access point after receipt of multiple beacon signals from the wireless access point.

8. A mobile device comprising:
   a processor;

a first wireless network interface coupled to the processor and configured to communicate to a mobile communications network; and a second wireless network interface coupled to the processor and configured to communicate with a wireless access point;

wherein the processor executes instructions to perform operations including:

receiving a beacon signal from the wireless access point via the second wireless network interface;

determining, based on the beacon signal and a size of a buffer of the mobile device, a speed threshold associated with the wireless access point;

determining a speed of the mobile device relative to the wireless access point;

performing a comparison of the speed to the speed threshold;

based on the comparison indicating that the speed satisfies the speed threshold, transmitting data to the wireless access point via the second wireless network interface; and based on the comparison indicating that the speed does not satisfy the speed threshold, transmitting the data to a mobile communication network node of the mobile communication network via the first wireless network interface.

9. The mobile device of claim 8, wherein the speed threshold corresponds to a speed at which the mobile device is capable of transmitting buffer data in the buffer before leaving a coverage area of the wireless access point.

10. The mobile device of claim 9, wherein the buffer data corresponds to the size of the buffer.

11. The mobile device of claim 8, further comprising receiving second data from the wireless access point via the second wireless network interface in response to transmitting the data to the wireless access point.

12. The mobile device of claim 8, wherein the data is transmitted to the wireless access point after receipt of multiple beacon signals from the wireless access point.

13. The mobile device of claim 8, further comprising a position device coupled to the processor to provide information associated with the mobile device to the processor to enable determination of the speed.

14. The mobile device of claim 8, wherein the processor determines the speed by receipt of speed data from the mobile communications network.

15. A computer-readable storage device of a mobile device comprising instructions executable by a processor to perform operations including:

receiving a beacon signal from a wireless access point;

determining, based on the beacon signal and a size of a buffer of the mobile device, a speed threshold associated with the wireless access point;

determining a speed of the mobile device relative to the wireless access point;

performing a comparison of the speed to the speed threshold;

based on the comparison indicating that the speed satisfies the speed threshold, transmitting data to the wireless access point; and based on the comparison indicating that the speed does not satisfy the speed threshold, transmitting the data from the mobile device to a mobile communication network node of a mobile communication network.

16. The computer-readable storage device of claim 15, wherein the data is transmitted to the wireless access point after receipt of multiple beacon signals from the wireless access point.

17. The computer-readable storage device of claim 15, wherein the beacon signal includes a velocity of the wireless access point.

18. The computer-readable storage device of claim 15, wherein the beacon signal includes an Institute of Electrical and Electronics Engineers 802.11 beacon.

19. The computer-readable storage device of claim 15, wherein the beacon signal further includes speed information that indicates a speed of the wireless access point or a velocity of the wireless access point.

20. The computer-readable storage device of claim 15, wherein the speed satisfies the speed threshold when the speed is less than the speed threshold.

* * * * *